United States Patent
Silva et al.

(10) Patent No.: US 8,784,211 B2
(45) Date of Patent: Jul. 22, 2014

(54) WIRELESS INPUT/OUTPUT AND PERIPHERAL DEVICES ON A GAMING MACHINE

(75) Inventors: Robert Silva, Reno, NV (US); Chris Lundy, Reno, NV (US); Garrett Olson, Reno, NV (US); Jason Kremer, Reno, NV (US); Joseph R. Hedrick, Reno, NV (US); Binh T. Nguyen, Reno, NV (US)

(73) Assignee: IGT, Las Vegas, NV (US)

( * ) Notice: Subject to any disclaimer, the term of this patent is extended or adjusted under 35 U.S.C. 154(b) by 1158 days.

(21) Appl. No.: 10/661,404

(22) Filed: Sep. 11, 2003

(65) Prior Publication Data

US 2004/0082385 A1    Apr. 29, 2004

Related U.S. Application Data

(63) Continuation-in-part of application No. 10/246,373, filed on Sep. 16, 2002, now Pat. No. 7,112,138, and a continuation-in-part of application No. 09/921,489, filed on Aug. 3, 2001, now Pat. No. 6,908,387.

(51) Int. Cl.
*A63F 9/24* (2006.01)
*G06F 17/00* (2006.01)
*G06F 1/32* (2006.01)
*G06F 9/44* (2006.01)
*H04L 12/28* (2006.01)
*G06F 3/033* (2013.01)
*G07F 17/32* (2006.01)

(52) U.S. Cl.
CPC ............ *G06F 1/3215* (2013.01); *G06F 9/4411* (2013.01); *G07F 17/3216* (2013.01); *G07F 17/32* (2013.01)
USPC .............. 463/42; 463/16; 463/1; 455/226.17; 455/557; 370/344

(58) Field of Classification Search
USPC .......... 455/226.1, 557; 463/16, 1, 42; 370/344
See application file for complete search history.

(56) References Cited

U.S. PATENT DOCUMENTS 4,669,730 A    6/1987   Small
(Continued)

FOREIGN PATENT DOCUMENTS

| AU | 199650576 | 4/1997 |
| AU | 200030185 | 11/2000 |

(Continued)

OTHER PUBLICATIONS

Joseph R. Hedrick et al., Player Tracking Communication Mechanisms in a Gaming Machine, Aug. 3, 2001, U.S. Appl. No. 09/921,489.

(Continued)

*Primary Examiner* — Masud Ahmed
*Assistant Examiner* — Frank M Leiva
(74) *Attorney, Agent, or Firm* — Neal, Gerber & Eisenberg LLP

(57) ABSTRACT

A disclosed gaming machine provides methods and apparatus for wirelessly communicating between devices within the gaming machine. The gaming machine includes a gaming machine housing to which a master gaming controller and one or more gaming peripherals can be mounted. The master gaming controller is adapted for executing a game of chance played on the gaming machine and communicating wirelessly with the one or more gaming peripherals used to play the game of chance. Furthermore, the gaming machine includes a wireless communication manager that can manage wireless communications between the master gaming controller and the gaming peripherals, between the gaming peripherals, or a combination thereof.

16 Claims, 7 Drawing Sheets

(56) References Cited

U.S. PATENT DOCUMENTS

| | | |
|---|---|---|
| 4,856,787 A | 8/1989 | Itkis |
| 5,129,652 A | 7/1992 | Wilkinson |
| 5,206,495 A | 4/1993 | Kreft |
| 5,318,298 A | 6/1994 | Kelly et al. |
| 5,326,104 A | 7/1994 | Pease et al. |
| 5,373,440 A | 12/1994 | Cohen et al. |
| 5,429,361 A | 7/1995 | Raven et al. |
| 5,575,717 A | 11/1996 | Houriet et al. |
| 5,643,086 A | 7/1997 | Alcorn et al. |
| 5,655,961 A | 8/1997 | Acres et al. |
| 5,702,304 A | 12/1997 | Acres et al. |
| 5,722,891 A | 3/1998 | Inoue |
| 5,735,742 A | 4/1998 | French |
| 5,741,183 A | 4/1998 | Acres et al. |
| 5,743,798 A | 4/1998 | Adams et al. |
| 5,752,882 A | 5/1998 | Acres et al. |
| 5,761,647 A | 6/1998 | Boushy |
| 5,770,533 A | 6/1998 | Franchi |
| 5,779,549 A | 7/1998 | Walker et al. |
| 5,809,482 A | 9/1998 | Strisower |
| 5,820,459 A | 10/1998 | Acres et al. |
| 5,833,540 A | 11/1998 | Miodunski et al. |
| 5,836,817 A | 11/1998 | Acres et al. |
| 5,838,384 A | 11/1998 | Schindler et al. |
| 5,851,149 A | 12/1998 | Xidos et al. |
| 5,876,284 A | 3/1999 | Acres et al. |
| 5,916,024 A | 6/1999 | Von Kohorn |
| 5,951,397 A | 9/1999 | Dickinson |
| 5,958,006 A | 9/1999 | Eggleston et al. |
| 6,003,013 A | 12/1999 | Boushy et al. |
| 6,012,832 A | 1/2000 | Saunders et al. |
| 6,048,269 A | 4/2000 | Burns et al. |
| 6,048,271 A | 4/2000 | Barcelou |
| 6,078,789 A | 6/2000 | Bodenmann et al. |
| 6,089,975 A | 7/2000 | Dunn |
| 6,104,815 A | 8/2000 | Alcorn et al. |
| 6,106,396 A | 8/2000 | Alcorn et al. |
| 6,110,041 A | 8/2000 | Walker et al. |
| 6,113,495 A | 9/2000 | Walker et al. |
| 6,135,884 A | 10/2000 | Hedrick et al. |
| 6,135,887 A | 10/2000 | Pease et al. |
| 6,142,876 A | 11/2000 | Cumbers |
| 6,149,522 A | 11/2000 | Alcorn et al. |
| 6,161,762 A | 12/2000 | Bashan et al. |
| 6,162,122 A | 12/2000 | Acres et al. |
| 6,164,652 A | 12/2000 | Lauretta et al. |
| 6,168,084 B1 | 1/2001 | Mish |
| 6,168,521 B1 | 1/2001 | Luciano et al. |
| 6,174,234 B1 | 1/2001 | Seibert et al. |
| 6,182,217 B1 | 1/2001 | Sedlak |
| 6,183,362 B1 | 2/2001 | Boushy |
| 6,186,893 B1 | 2/2001 | Walker et al. |
| 6,193,163 B1 | 2/2001 | Fehrman et al. |
| 6,195,712 B1 * | 2/2001 | Pawlowski et al. ............ 710/19 |
| 6,202,932 B1 | 3/2001 | Rapeli |
| 6,210,279 B1 | 4/2001 | Dickinson |
| 6,227,970 B1 | 5/2001 | Shimizu et al. |
| 6,230,029 B1 | 5/2001 | Hahn et al. |
| 6,238,288 B1 | 5/2001 | Walker et al. |
| 6,244,958 B1 | 6/2001 | Acres |
| 6,254,483 B1 | 7/2001 | Acres |
| 6,257,981 B1 | 7/2001 | Acres et al. |
| 6,264,560 B1 | 7/2001 | Goldberg et al. |
| 6,308,227 B1 * | 10/2001 | Kumar et al. ..................... 710/4 |
| 6,315,660 B1 | 11/2001 | DeMar et al. |
| 6,319,125 B1 | 11/2001 | Acres |
| 6,325,294 B2 | 12/2001 | Tuttled et al. |
| 6,343,988 B1 | 2/2002 | Walker et al. |
| 6,371,852 B1 | 4/2002 | Acres |
| 6,379,246 B1 | 4/2002 | Dabrowski |
| 6,383,076 B1 | 5/2002 | Tiedeken |
| 6,397,387 B1 | 5/2002 | Rosin et al. |
| 6,398,649 B1 | 6/2002 | Sugaya |
| 6,409,595 B1 | 6/2002 | Uihlein et al. |
| 6,487,180 B1 | 11/2002 | Borgstahl et al. |
| 6,582,310 B1 | 6/2003 | Walker et al. |
| 6,587,450 B1 * | 7/2003 | Pasanen ........................ 370/338 |
| 6,587,835 B1 | 7/2003 | Treyz et al. |
| 6,629,591 B1 | 10/2003 | Griswold et al. |
| 6,638,170 B1 | 10/2003 | Crumby |
| 6,769,982 B1 * | 8/2004 | Brosnan ........................ 463/16 |
| 6,782,245 B1 * | 8/2004 | Lazzarotto et al. ........ 455/226.1 |
| 6,814,665 B2 | 11/2004 | Seelig et al. |
| 6,857,021 B1 | 2/2005 | Schuster et al. |
| 6,866,586 B2 | 3/2005 | Oberberger et al. |
| 6,908,324 B1 * | 6/2005 | Morley et al. .................. 439/218 |
| 6,908,387 B2 | 6/2005 | Hedrick et al. |
| 6,922,567 B1 | 7/2005 | Rydbeck |
| 6,970,602 B1 | 11/2005 | Smith et al. |
| 6,987,947 B2 | 1/2006 | Richenstein et al. |
| 7,032,115 B2 * | 4/2006 | Kashani ........................ 713/300 |
| 7,112,138 B2 | 9/2006 | Hedrick et al. |
| 7,203,665 B2 | 4/2007 | Donner |
| 7,231,380 B1 | 6/2007 | Pienkos |
| 7,280,975 B1 | 10/2007 | Donner |
| 7,927,212 B2 | 4/2011 | Hedrick et al. |
| 8,210,927 B2 | 7/2012 | Hedrick et al. |
| 2001/0010689 A1 * | 8/2001 | Awater et al. .................. 370/344 |
| 2001/0044339 A1 | 11/2001 | Cordero et al. |
| 2001/0048685 A1 | 12/2001 | Park et al. |
| 2001/0049775 A1 | 12/2001 | Rechberger et al. |
| 2002/0042296 A1 | 4/2002 | Walker |
| 2002/0047044 A1 | 4/2002 | Orus et al. |
| 2002/0052239 A1 * | 5/2002 | Finn ............................... 463/40 |
| 2002/0080967 A1 * | 6/2002 | Abdo et al. .................... 380/270 |
| 2002/0107066 A1 | 8/2002 | Seelig et al. |
| 2002/0116615 A1 | 8/2002 | Nguyen et al. |
| 2002/0149470 A1 | 10/2002 | Mynatt et al. |
| 2002/0167406 A1 | 11/2002 | Garber et al. |
| 2002/0174336 A1 | 11/2002 | Sakakibara et al. |
| 2002/0174364 A1 * | 11/2002 | Nordman et al. ............ 713/201 |
| 2002/0187828 A1 * | 12/2002 | Benbrahim ..................... 463/29 |
| 2002/0194619 A1 | 12/2002 | Chang et al. |
| 2003/0003997 A1 | 1/2003 | Vuong et al. |
| 2003/0017865 A1 | 1/2003 | Beaulieu et al. |
| 2003/0017871 A1 | 1/2003 | Urie et al. |
| 2003/0027631 A1 | 2/2003 | Hedrick et al. |
| 2003/0040960 A1 | 2/2003 | Eckmann |
| 2003/0043771 A1 * | 3/2003 | Mizutani et al. .............. 370/338 |
| 2003/0054881 A1 | 3/2003 | Hedrick et al. |
| 2003/0064805 A1 | 4/2003 | Wells |
| 2003/0067389 A1 | 4/2003 | Look |
| 2003/0095525 A1 | 5/2003 | Lavin |
| 2003/0119575 A1 | 6/2003 | Centuori et al. |
| 2003/0125973 A1 | 7/2003 | Mathews et al. |
| 2003/0176218 A1 | 9/2003 | LeMay et al. |
| 2004/0025594 A1 | 2/2004 | Broden et al. |
| 2004/0137978 A1 * | 7/2004 | Cole et al. ..................... 463/16 |
| 2005/0003890 A1 | 1/2005 | Hedrick |
| 2005/0069101 A1 | 3/2005 | Bear |
| 2005/0113172 A1 | 5/2005 | Gong |
| 2005/0116020 A1 | 6/2005 | Smolucha et al. |
| 2005/0136949 A1 | 6/2005 | Barnes |
| 2005/0154823 A1 | 7/2005 | Bruner |
| 2005/0187012 A1 | 8/2005 | Walker et al. |
| 2006/0126861 A1 | 6/2006 | Saliterman |
| 2006/0173781 A1 | 8/2006 | Donner |
| 2006/0188118 A1 | 8/2006 | Berger et al. |
| 2006/0252529 A1 | 11/2006 | Hedrick et al. |
| 2007/0087810 A1 | 4/2007 | Walker et al. |
| 2007/0242834 A1 | 10/2007 | Coutinho et al. |
| 2007/0287516 A1 | 12/2007 | Cheung et al. |
| 2008/0051195 A1 | 2/2008 | Hedrick et al. |
| 2008/0254886 A1 | 10/2008 | Kelly |
| 2012/0088573 A1 | 4/2012 | Hedrick et al. |

FOREIGN PATENT DOCUMENTS

| | | | |
|---|---|---|---|
| CA | 2442442 | 10/1995 | |
| CA | 2151990 | 12/1995 | |
| EP | 0360613 | 3/1990 | |
| EP | 0 769 769 | 4/1997 | |
| EP | 1096438 A2 | 5/2001 | ............... G07F 7/10 |
| WO | WO 96/09100 | 3/1996 | |

(56) References Cited

FOREIGN PATENT DOCUMENTS

| WO | WO 96/12262 | 4/1996 | |
| --- | --- | --- | --- |
| WO | WO 98/12648 | 3/1998 | G06F 15/44 |
| WO | 0078419 | 12/2000 | |
| WO | WO0217251 | 2/2002 | |
| WO | WO0224288 | 3/2002 | |
| WO | WO03/015042 | 2/2003 | |
| WO | WO 02/25594 | 3/2004 | |
| WO | WO 2004/025594 | 3/2004 | G07F 17/32 |
| WO | WO 2004/025594 A1 | 3/2004 | |
| WO | WO2004/025595 | 3/2004 | |
| WO | WO2006/015233 | 2/2006 | |
| WO | WO2006/105182 | 10/2006 | |

OTHER PUBLICATIONS

Michael M. Oberberger et al., Cashless Transaction Clearinghouse, Nov. 16, 2001, U.S. Appl. No. 09/993,163.
Steven G. LeMay et al., Game Development Architecture that decouples the Game Logic from the Graphics Logic, Jan. 1, 2002, U.S. Appl. No. 10/040,239.
Binh T. Nguyen et al., Secured Virtual Network in a Gaming Environment, Apr. 3, 2002, U.S. Appl. No. 10/116,424.
Joseph R. Hedrick et al., Player Tracking Communication Mechanisms in a Gaming Machine, Sep. 16, 2002, U.S. Appl. No. 10/246,373.
William R. Brosnan et al., Identifying Message Senders, Nov. 7, 2002, U.S. Appl. No. 10/291,926.
Rex Y. Lam, et al., Usb Software Architecture in a Gaming Machine, Jun. 11, 2003, U.S. Appl. No. 10/460,822.
Erasala N et al: "Bluetooth technology: A Strategic Analysis of Its Role in Global 3G Wireless Communication Era", Computer Standards and Interfaces, Elsevier Sequoia. Lausanne, CH, vol. 24, No. 3, Jul. 2002, pp. 193-206, XP004360409, ISSN: 0920-5489, the whole document.
"Leading-edge smart card technology meets smartest watch technology"; Business News from Philips Semiconductors, E/BN-1148/60, Aug. 29, 2000.
Office Action Summary, 13 page document, U.S. Appl. No. 10/084,820, filed Feb. 27, 2002, Dated: May 12, 2003.
Office Action Summary, 8 page document, U.S. Appl. No. 10/183,892, filed Sep. 27, 2002, Dated: Mar. 11, 2005.
Wells, et al. 21 page document entitled "Gaming Terminal and System With Biometric Identification", IGT, U.S. Appl. No. 09/491,899/ p. 220.
PCT Search Report and Written Opinion dated Nov. 30, 2005 from corresponding PCT Application No. PCT/US2005/027032 (8 pages).
EP Office Action dated Jul. 11, 2006 in corresponding EP Application No. 03755819.4.
Examiner's Communication pursuant to Article 96(2) EPC, dated Dec. 27, 2006, from corresponding European Patent Application No. 02 765 884.8.
International Search Report, dated Oct. 9, 2006, from corresponding International Application No. PCT/US2006/011443.
Office Action dated Oct. 3, 2003 from U.S. Appl. No. 09/921,489.
Final Office Action dated Apr. 7, 2004 from U.S. Appl. No. 09/921,489.
Notice of Allowance dated Feb. 10, 2005 from U.S. Appl. No. 09/921,489.
Office Action dated Dec. 13, 2005 from U.S. Appl. No. 10/246,373.
Notice of Allowance dated Jun. 2, 2006 from U.S. Appl. No. 10/246,373.
Office Action dated Jan. 24, 2008 from U.S. Appl. No. 10/903,024.
Written Opinion of International Searching Authority, dated Oct. 12, 2006 from International Patent Application No. PCT/US2006/ 011443 (7 pages).
Marshall Fey, Slot Machines, A Pictorial History of the First 100 years, Liberty Belle Books, pp. 100-117, 1983.
Charny et al., "Magnets attracting wireless attention", CNET News. com, http://www.news.com, Sep. 19, 2003, pp. 1-2.
Advisory Office Action from Russian Patent Application No. 2005106989/09 dated Sep. 11, 2003.
Advisory Office Action dated Sep. 10, 2007 from Russian Patent Application No. 2005106989/09.
Oral Proceedings dated Aug. 13, 2007 from European Patent Application No. 02765884.8 (6 pages).
Office Action dated Apr. 21, 2008 from European Patent Application No. 03755819.4.
Office Action dated Apr. 29, 2008 from U.S. Appl. No. 11/471,352.
Office Action dated Apr. 29, 2008 from U.S. Appl. No. 11/829,718.
Search Report dated Jan. 29, 2008 from European Patent Application No. 07020533.1.
Office Action dated Jul. 25, 2007 from Australian Patent Application No. 2002329644.
Advisory Office Action dated May 13, 2008 from Russian Patent Application No. 2005106989/09.
Office Action dated Feb. 26, 2008 from U.S. Appl. No. 11/094,943.
Office Action dated Aug. 12, 2008 from U.S. Appl. No. 10/903,024.
Office Action dated Sep. 11, 2008 from U.S. Appl. No. 11/094,943.
Office Action dated Dec. 24, 2008 from U.S. Appl. No. 10/903,024.
Office Action dated Dec. 5, 2008 from Australian Patent Application No. 2003273319.
Office Action dated Jan. 8, 2009 from U.S. Appl. No. 11/471,352.
Office Action dated Jan. 8, 2009 from U.S. Appl. No. 11/829,718.
Examination Report dated Feb. 2, 2009 from related Australian Application No. 2003267167.
Decision to Refuse dated Feb. 23, 2009 from related European Application No. 03755819.4.
Office Action dated Mar. 27, 2009 from U.S. Appl. No. 11/094,943.
Examination Report dated Apr. 29, 2009 from European Patent Application No. 06739913.9.
Final Office Action dated Jun. 4, 2009 from U.S. Appl. No. 11/471,352.
Office Action dated Mar. 13, 2009 from Chinese Patent Application No. 2006800110753.
Statement of Grounds and Particulars dated May 15, 1009 from Australian Patent Application No. 2002329644.
Statement of Grounds dated Jun. 30, 1009 from European Patent Application No. 03755819.4.
Final Office Action dated Aug. 31, 2009 from U.S. Appl. No. 11/829,718.
Final Office Action dated Oct. 2, 2009 from U.S. Appl. No. 10/903,024.
Final Office Action dated Oct. 2, 2009 from U.S. Appl. No. 11/094,943.
Final Office Action dated Jan. 8, 2010 from U.S. Appl. No. 11/471,352.
Office Action dated Dec. 23, 2009 from Australian Patent Application No. 2003273319.
Office Action dated Feb. 22, 2010 from U.S. Appl. No. 11/094,943.
Second Office Action dated Feb. 5, 2010 from Chinese Patent Application No. 2006800110753.
Examination Report dated Apr. 20, 2010 from Australian Patent Application No. 2005267865.
Final Office Action dated Aug. 5, 2010 from U.S. Appl. No. 11/094,943.
Office Action dated Aug. 3, 2010 from U.S. Appl. No. 11/471,352.
Examination Report dated Sep. 20, 2010 from Australian Patent Application No. 2006230257.
Notice of Allowance dated Oct. 29, 2010 from U.S. Appl. No. 10/903,024.
2$^{nd}$ Notice of Allowance dated Dec. 30, 2010 from U.S. Appl. No. 10/903,024.
U.S. Final Office Action dated Jan. 21, 2011 issued in U.S. Appl. No. 11/471,352.
U.S. Notice of Allowance dated Feb. 27, 2012 issued in U.S. Appl. No. 11/471,352.
U.S. Notice of Allowance dated Dec. 13, 2011 issued in U.S. Appl. No. 11/829,718.
U.S. Notice of Allowance dated Sep. 14, 2012 issued in U.S. Appl. No. 11/829,718.
U.S. Notice of Allowance dated Nov. 7, 2011 issued in U.S. Appl. No. 11/094,943.

(56) References Cited

OTHER PUBLICATIONS

PCT International Preliminary Examination Report dated Jun. 5, 2003 issued in PCT/US02/23778.

PCT International Search Report dated Jan. 23, 2004 issued in PCT/US03/028693.

CA Office Action dated Feb. 1, 2011 issued in Canadian Application No. 2,498,814.

PCT International Preliminary Report on Patentability and Written Opinion dated Jan. 30, 2007 issued in PCT Application No. PCT/US2005/027032.

AU Examiner's Report No. 2 dated Jul. 28, 2011 issued in Australian Patent Application No. 2006230257.

CN Third Office Action dated Dec. 7, 2011 issued in Chinese Patent Application No. 200680011075.3.

CN Fourth Office Action dated May 31, 2012 issued in Chinese Patent Application No. 200680011075.3.

CN Fifth Office Action dated Aug. 31, 2012 issued in Chinese Patent Application No. 200680011075.3.

Office Action for Canadian Patent Application No. 2,498,814, dated Feb. 3, 2012 (4 pages).

International Search Report for PCT Application No. PCT/US03/28694, dated Feb. 24, 2004 (2 pages).

Third Party Submission in Published Application Under 37 C.F.R. § 1.99 submitted for U.S. Appl. No. 13/329,110 on Jun. 11, 2012 (2 pages).

\* cited by examiner

WIRELESS INPUT/OUTPUT AND PERIPHERAL DEVICES ON A GAMING MACHINE

CROSS REFERENCE TO RELATED APPLICATIONS

The present application is a continuation-in-part of and claims priority from both U.S. patent application Ser. No. 10/246,373, (IGT P060X1/P-568CIP), filed on Sep. 16, 2002 now U.S. Pat. No. 7,122,138, by Hedrick et al., and entitled "PLAYER TRACKING COMMUNICATION MECHANISMS IN A GAMING MACHINE," and U.S. patent application Ser. No. 09/921,489, (IGT 1P060/P-568), filed on Aug. 3, 2001 now U.S. Pat. No. 6,908,387, by Hedrick et al., and entitled "PLAYER TRACKING COMMUNICATION MECHANISMS IN A GAMING MACHINE," both of which are hereby incorporated by reference in their entirety for all purposes. U.S. patent application Ser. No. 10/246,373 is a continuation-in-part of and claims priority from U.S. patent application Ser. No. 09/921,489.

BACKGROUND OF THE INVENTION

I. Field of the Invention

The present invention relates to gaming machines such as video slot machines and video poker machines. More particularly, the present invention relates to methods and apparatus for providing wireless communications within a gaming machine.

II. Background

Typically, utilizing a master gaming controller, a gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, such as bill validators and coin acceptors, to accept money and/or credits into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

There is a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into either the gaming machine cabinet or into components associated with the gaming machine such as a top box that usually sits on top of the gaming machine. These devices are typically connected to other devices, such as the master gaming controller, by wires that are organized by harnesses. Generally, the harnesses tie together groups of wires within the gaming machine in order to reduce the risk that the interior of the gaming machine will become full of tangled wires. Harnessing the wires in this manner can facilitate maintenance and repair of wires and devices because specific wires can be located more easily. For instance, if all of the wires connected to a display screen are harnessed together, then maintenance and repair personnel need only identify the appropriate group of wires to narrow down a search for a particular wire.

Traditionally, in the gaming industry, gaming machines have been relatively simple in the sense that the number of peripheral devices and the number of functions the gaming machine has been limited. Further, in operation, the functionality of gaming machines was relatively constant once the gaming machine was deployed, i.e., new peripheral devices and new gaming software were infrequently added to the gaming machine. Often, to satisfy the unique requirements of the gaming industry in regards to regulation and security, circuit boards for components, such as the backplane and the master gaming controller, have been custom built with peripheral device connections hard-wired into the boards. Further, the peripheral device connections, communication protocols used to communicate with the peripheral devices over the peripheral device connections, and software drivers used to operate the peripheral devices have also been customized varying from manufacturer to manufacturer and from peripheral device to peripheral device. For example, communication protocols used to communicate with peripheral devices are typically proprietary and vary from manufacturer to manufacturer.

In recent years, in the gaming industry, the functionality of gaming machines has become increasingly complex. Further, the number of manufacturers of peripheral devices in the gaming industry has greatly increased. After deployment of a gaming machine, there is a desire to i) easily add new capabilities that are afforded by new/upgraded gaming software and new/upgraded peripheral devices from a wide variety of manufacturers and ii) easily change the combinations of internal/external peripheral devices deployed on the gaming machines.

The personal computer industry has dealt with issues relating to device compatibility and, in recent years, there has been a desire in the gaming industry to adapt technologies used in the personal computer industry to gaming. At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment.

As described above, one important difference between PCs and gaming machines is that the security needs of the gaming industry are generally higher than the PC industry. Gaming machines typically include monetary I/O devices, such as coin dispensers, bill validators and ticket printers and computing devices that are used to govern the input and output of cash to a gaming machine. These devices have security requirements that are not typically addressed in PC connectivity architectures. Further, a fault or a weakness tolerated in a PC, such as security holes in software/hardware or frequent crashes, may not be tolerated in a gaming machine because these faults can lead to a direct loss of funds from the gaming machine, such as stolen cash, or loss of revenue when the gaming machine is not operating properly. Thus, many PC techniques and methods developed to facilitate device connectivity and device compatibility do not address the emphasis placed on security in the gaming industry.

As the number of devices packaged with the gaming machine increases, the number of wires needed to connect these devices to the gaming machine also increases. In addition, issues relating to device compatibility and to device connectivity have become increasingly more important. Although harnessing provides improved organization within a gaming machine, even harnessed wires can become densely packed within the gaming machine, thereby making it difficult to locate particular wires. Further, since the devices in a gaming machine are typically densely packed, the routing of the wires in the cabinet also becomes an issue. Densely packed wires within the machine can provide an increased risk of damage to the wires and make maintenance of the gaming machine more difficult. For instance, a wire bundle may be damaged when a device unrelated to the bundle is removed for maintenance or a new device is installed in the gaming machine. As another example, some connection points may be difficult and hard to reach in a densely packed gaming machine or the connections may be hard to make when a large number of connections are tightly packed together, such as on the backplane of the gaming machine. Accordingly, it would be desirable to reduce the number of wires and the amount of harnessing within a gaming machine, such that gaming machine devices can be manufactured, maintained, and repaired with reduced time and cost.

SUMMARY OF THE INVENTION

The techniques of the present invention address the above need by providing methods and apparatus that reduce the number of wires and need for harnessing within a gaming machine. More particularly, the techniques of the present invention accomplish this by providing wireless communications between gaming devices within a gaming machine.

One aspect of this invention pertains to a gaming machine. Such gaming machine may be characterized by the following features: a gaming machine housing; a master gaming controller adapted for executing a game of chance played on the gaming machine and communicating wirelessly with one or more peripheral devices used to play the game of chance, wherein the one or more peripheral devices are mounted within the gaming machine housing; and a wireless communication manager executed by the master gaming controller adapted for managing wireless communications between (i) the master gaming controller and the peripheral devices, (ii) the peripheral devices, or both (i) and (ii).

Another aspect of the invention pertains to a method of providing wireless communications between devices in a gaming machine. Such method may be characterized by the following sequence: composing and encrypting a message from a first gaming device to a second gaming device, wherein the first gaming device and second gaming device are associated with the gaming machine, and wherein a first communication identification key associated with the first gaming device is used to provide sender information and a second communication key associated with the second gaming device is used to provide receiver information; wirelessly sending the message from the first gaming device to the second gaming device using the first identification key and the second identification key; and determining at the first gaming device whether the message was received by the second gaming device.

Still another aspect of the invention pertains to a method of receiving wireless communications between devices in a gaming machine. Such method may be characterized by the following sequence: wirelessly receiving packets from a first gaming device at a second gaming device, wherein the first gaming device and second gaming device are associated with the gaming machine, the packets having a first communication identification key associated with the first gaming device; wirelessly sending confirmation packets to the first gaming device; authenticating the received packets from the first gaming device using the first communication identification key; assembling authenticated packets into a message from the first gaming device; and processing the message at the second gaming device.

Yet another aspect of the invention pertains to computer program products including machine-readable media on which are stored program instructions for implementing a portion of or an entire method as described above. Any of the methods of this invention may be represented, in whole or in part, as program instructions that can be provided on such computer readable media. In addition, the invention pertains to various combinations of data generated and/or used as described herein.

These and other features and advantages of the present invention will be described in more detail below with reference to the associated figures.

DETAILED DESCRIPTION OF INVENTION

Figure 1:
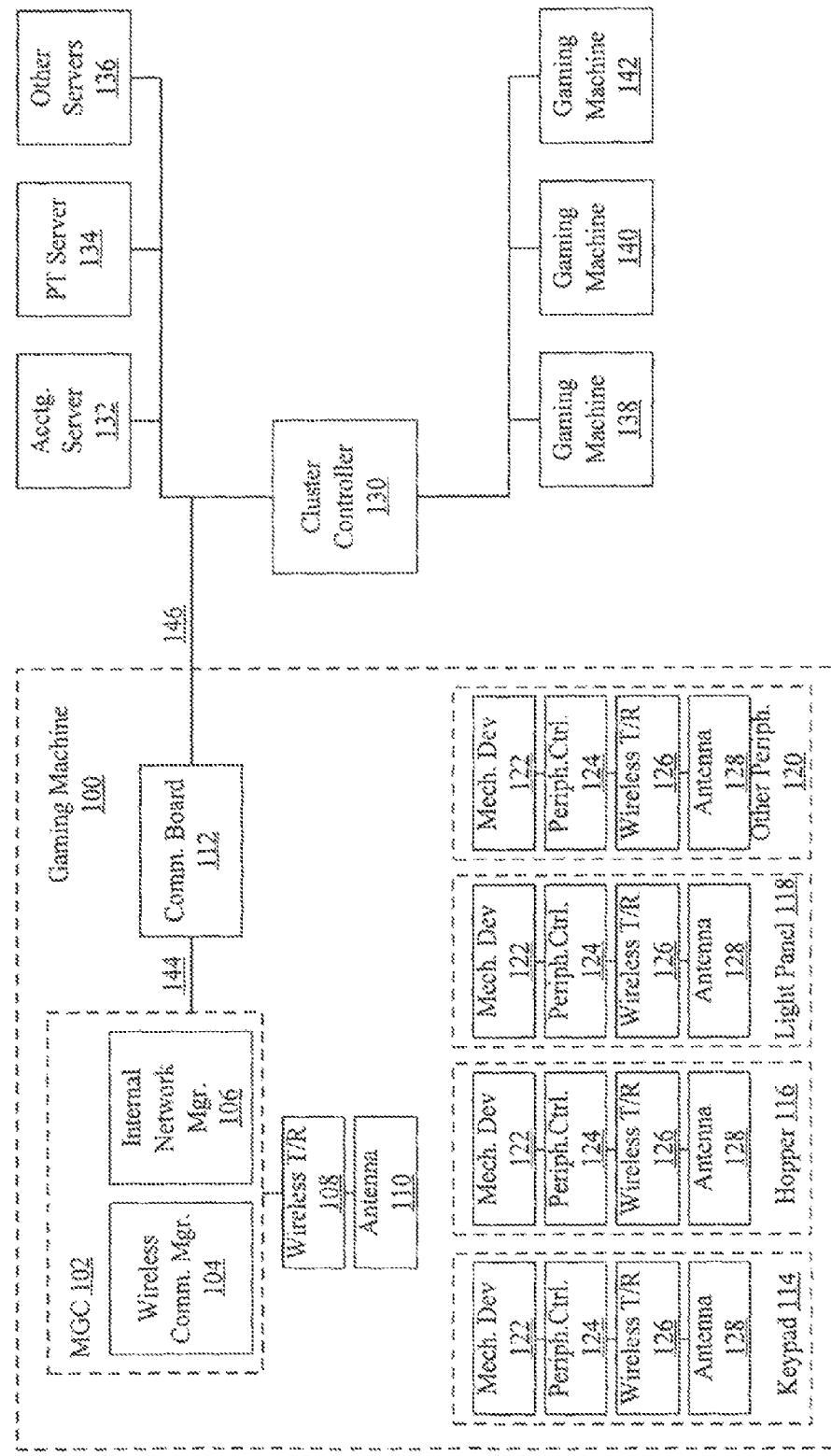
FIG. 1 is a diagrammatic representation of a gaming system configured to allow wireless communications within a gaming machine.

As described above in the Background section, wires for various devices associated with a gaming machine, such as player tracking units, lights, ticket printers, card readers, speakers, bill validators, ticket readers, coin acceptors, display panels, key pads, coin hoppers, button pads, and the like, are typically used to connect the various devices to other devices. Groups of these wires are often harnessed together to reduce the number of tangled wires within the gaming machine and to facilitate the maintenance and repair of the wires. However, the number of wires placed within the gaming machine, whether harnessed or not, can result in various associated costs. For instance, because various devices associated with the gaming machine are frequently moved or adjusted, such as coin hoppers, bill stackers, and the like, wires that become involved with these devices can become crimped, pinched, or otherwise damaged.

Other mechanical limitations can include wear due to movement of the wires, faulty wires, limited tolerances of the wires, and the like. Each of these mechanical limitations can affect the lifespan of the wires, and may require periodic replacement of the wires. In addition, wires can be accidentally cut during repairs or maintenance, thereby requiring the investment of additional time and costs to repair the broken wires. Furthermore, locating particular wires can be challenging. Even if a group of harnessed wires containing the desired wire is located, locating a single wire in the group can require using a voltmeter to measure the current on the individual wires to identify which wire should be repaired. However, this process is time-consuming, and can keep a gaming machine off-line for an extended period of time.

In other examples, the wiring harnesses used in many gaming machines have connectors at both ends. Terminated wires are inserted and locked into pin positions on these connectors. If a wire is locked into an incorrect pin position on a connector, this error may not be detected until the machine has been delivered, depending on the signal that the wire is carrying. Because human input is a part of many current manufacturing processes for harnessing, errors can be made. For instance, harnesses may not conform to the wiring diagrams provided to the manufacturer. Accordingly, the harnessed wires may not be operable or compatible with the gaming machine. Additionally, when gaming machine equipment is changed or upgraded, the mechanical configuration of a wiring harness may need to be changed even if the signals and electrical functionality of the harness remain the same. In particular, even if the wires for an old part are compatible with the wires for a new part, the connector associated with the new part may not mate with the connector associated with the old part. For instance, the connectors associated with a new harness may not mate with the old connector location on a board in a gaming machine cabinet.

Accordingly, reducing the number of wires and the amount of harnessing within a gaming machine can reduce the costs associated with repairing and maintaining gaming machines. Furthermore, reducing the number of wires and the amount of harnessing can reduce the costs of production for gaming machines by reducing the amount of hardware installed, the amount of engineering costs needed to manage the wires in the interior region of the gaming machine, and the amount of manufacturing costs associated with installing and harnessing the wires.

Various embodiments of the present invention address this need by providing a wireless network within a gaming machine. Traditionally, wires have been used to connect devices within a gaming machine for various reasons, including security. The techniques of the present invention provide wireless interfaces within a gaming machine, and provide security mechanisms and signal transmission barriers to increase the security of communications between the wireless interfaces. More particularly, mechanisms are provided for reducing signal strength and providing barriers to signal transmission to limit the leakage of signals from the gaming machine and cross-talk with external devices. Furthermore, the techniques of the present invention provide a cost-effective alternative to including individual wires for each gaming machine device. With reference to FIG. 1, shown is a diagrammatic representation of a gaming system configured to allow wireless communications within a gaming machine. The gaming system shown includes gaming machine 100, cluster controller 130, accounting server 132, player tracking server 134, other servers 136, and gaming machines 138, 140, and 142. Gaming machine 100 can communicate with cluster controller 130, servers 132, 134, and 136 and gaming machines 138, 140, and 142 through connection 146, which can be a wired or wireless connection. Within gaming machine 100, various components can communicate with each other over a local network. Specifically, master gaming controller 102 can communicate with peripheral devices such as keypad 114, hopper 116, light panel 118, or other peripherals 120. Master gaming controller 102 can transmit and receive messages using wireless transmitter/receiver 108 and antenna 110. Peripheral devices 114, 116, 118, and 120 can also transmit and receive messages using wireless transmitters/receivers 126 and antenna 128. Master gaming controller 102 can communicate with various peripheral devices, and in some embodiments, the peripheral devices can communicate with each other.

Each of the peripheral devices can include a mechanical device 122. For instance, the mechanical device 122 associated with keypad 114 can be a physical keypad having buttons. The peripheral controller 124 associated with the peripheral device can provide the logic to control operation of the mechanical device 122 and can provide messages to other devices through wireless transmitter/receiver 126 and antenna 128. Wireless transmitter/receiver 126 can act as a transport layer that prepares messages for being transmitted or received through antenna 128. Furthermore, antenna 128 can broadcast communications within the internal network of gaming machine 100, and can receive broadcast communications from other components within gaming machine 100. The wireless transmitter/receiver 108 and antenna 110 associated with the master gaming controller 102 can be configured analogously.

In some embodiments, the peripheral devices shown can include programmable interfaces that allow the peripheral devices to communicate wirelessly with other devices. Furthermore, a programmable interface can allow a particular peripheral device to be replaced or modified without much time or expense. For instance, if the mechanical device 122 associated with keypad 114 is replaced, the programmable interface can be updated to allow operation of the new mechanical device within the gaming machine.

Wireless communications within gaming machine 100 can be implemented using proprietary or non-proprietary wireless communication protocols. Some examples of non-proprietary standard wireless communication protocols that can be used include Bluetooth™, IEEE 802.11a, IEEE 802.11b, IEEE 802.11x (e.g. other IEEE 802.11 standards), hiperlan/2, HomeRF, and the like.

Various features can be included to improve the security of communications within gaming machine 100. Some of these features are provided in conjunction with wireless communication manager 104. Specifically, the wireless communication manager 104 can configure the peripheral devices to communicate with the master gaming controller 102 and/or with each other using various identifiers, frequency hopping algorithms, and the like, to secure communications, as described in more detail below. These communications can also be encrypted to provide additional security.

In addition, security can be improved by limiting the signal strength of the communications within the internal network generated within the gaming machine 100. By limiting the signal strength of these communications, interference and cross-talk with other gaming machines and external devices can be reduced and security of the communications within the gaming machine 100 can be increased. One way to limit the signal strength is to broadcast communications with a limited range or coverage area. Another way to limit the signal strength is to shield the broadcasted communications with the gaming machine housing (see FIG. 2). The gaming machine housing can be made of metal, or any other material that limits the broadcasted communications to within the gaming machine 100. By shielding communications in this way, interference and cross-talk between the gaming machine and external devices or other gaming machines can be reduced, thereby improving the security of communications within the gaming machine. In addition, by limiting signal strength, it will be more difficult for unauthorized individuals to "sniff" gaming machine 100 communications.

In the present embodiment, master gaming controller 102 can include wireless communication manager 104 and internal network manager 106. Wireless communication manager 104 can configure a peripheral controller associated with a peripheral device to communicate wirelessly with the master gaming controller 102, another peripheral device, or both the master gaming controller 102 and the other peripheral device. The wireless communication manager 104 can configure the peripheral controller in various ways. For instance, the wireless communication manager can configure the peripheral controller by assigning a communication identification key to the peripheral device associated with the peripheral controller. In one embodiment, the communication identification key can be a global unique identifier that is used to identify the peripheral device in wireless communications to and from the peripheral device. In another embodiment, the communication identification key can be a frequency range that is assigned to the peripheral device and is used to identify the peripheral device in wireless communications to and from the peripheral device. In another embodiment, the communication identification key can include a frequency hopping algorithm that temporally assigns different frequency ranges within which to communicate to and from the peripheral device. For instance, a device may use 79 or more randomly chosen frequencies within a designated range that change on a regular basis up to 1,600 times a second. Thus, even if interference occurs, it is likely only to occur for a short period of time. For instance, communications can be established between master gaming controller 102 and a peripheral device or between peripheral devices to form a piconet, or the like. The members of the piconet can randomly hop frequencies in unison so they remain in touch with another and avoid other piconets that may be operating in proximity to the established piconet. Within the gaming machine 100, many such piconets may be operating simultaneously.

In yet another embodiment, the communication identification key can be a formatting protocol that allows the peripheral device to filter out wireless communications intended for other devices. Different formatting protocols can be assigned to different devices within the gaming machine. In another embodiment, the communication identification key can be a spread spectrum that provides information that allows the peripheral device to packetize outgoing messages and reassemble packets received from the master gaming controller or another peripheral device as part of an incoming message.

Internal network manager 106 can manage the internal wireless network implemented within the gaming machine 100. More specifically, the internal network manager can monitor the reliability of the internal network and can also adjust the network or initiate an adjustment to the network to improve reliability, depending on the application. For instance, the internal network manager 106 can count the number of packets lost during a particular time interval to determine a reliability rate. The packets lost can represent the number of packets for which no acknowledgement or other confirmation was received, packets that were corrupted, and the like. According to another example, the internal network manager 106 can monitor different frequency channels.

As suggested above, in some embodiments, the internal network manager 106 can adjust the internal wireless network if the reliability rate exceeds a desired level. In other embodiments, the internal network manager 106 can notify other gaming machine 100 components to initiate the adjustment of the network if the reliability rate exceeds a desired level. In yet other embodiments, the internal network manager 106 can provide records of network performance information such as reliability rates, packet losses, and the like. These records can be used by gaming establishment personnel, other devices within the gaming machine 100 or the gaming machine network, and the like.

In the present embodiment, gaming machine 100 can communicate with other components of the gaming system using one or more communication boards 112. As shown, master gaming controller 102 can communicate with other components through connection 144, communication board 112, and connection 146. Connections 144 and 146 can be wired connections, wireless connections, or the like.

Although the present embodiment depicts a gaming machine 100 having only wireless communications between the master gaming controller 102 and peripheral devices 114, 116, 118, and 120, it should be recognized that wired communications can also be included in gaming machine 100 alongside wireless connections. By including at least some wireless connections between gaming machine 100 devices, the number of wires and amount of harnessing can be reduced. Furthermore, although the present embodiment depicts particular components, it should be recognized that modifications can be made within the scope of the present invention. For instance, although three additional gaming machines are shown as connected to cluster controller 130, any number of gaming machines can be included. Additionally, various components within gaming machine 100 can be added, omitted, or modified. Furthermore, various servers can be added, omitted, or modified.

Figure 2:
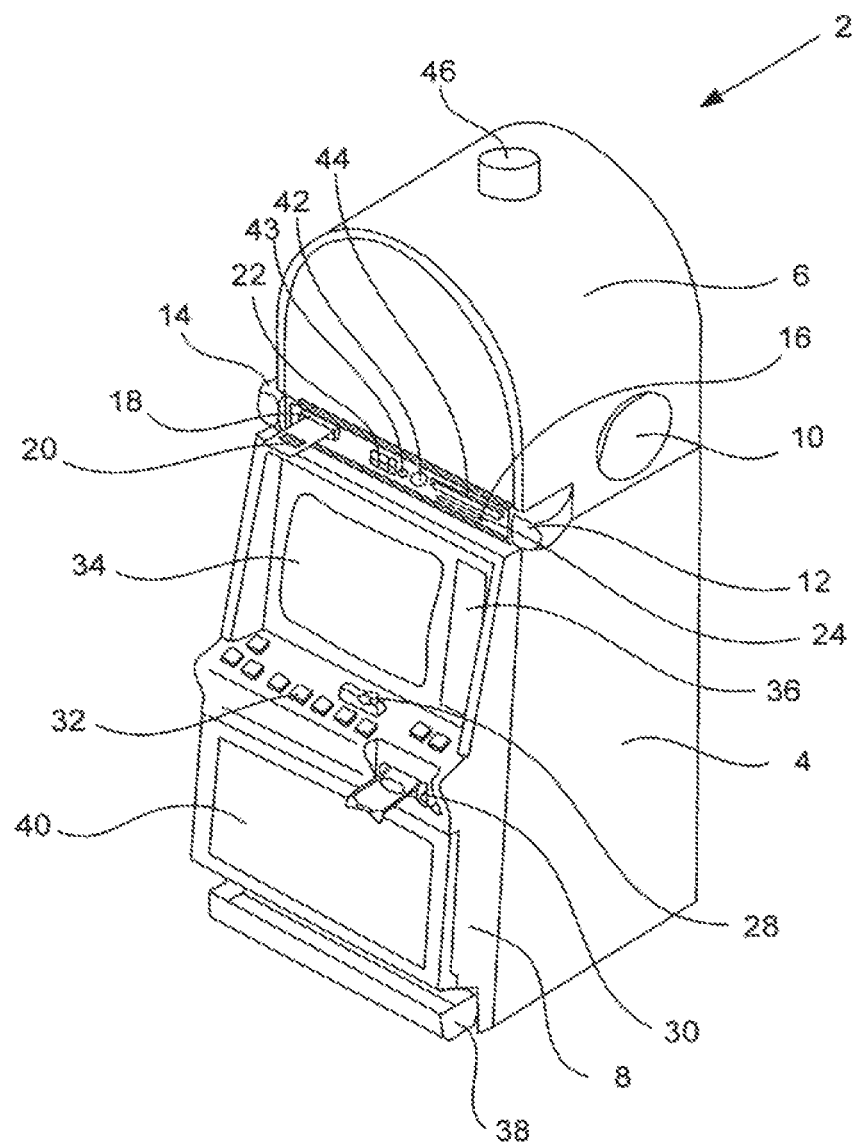
FIG. 2 is a diagrammatic representation of a gaming machine.

With reference to FIG. 2, shown is a diagrammatic representation of one embodiment of a gaming machine. More particularly, the gaming machine shown is a video gaming machine 2 that includes a main cabinet 4, which generally surrounds the machine interior (not shown) and is viewable by users. The main cabinet 4 can be made of a material that can shield wireless communications and limit broadcasted communications to within the gaming machine 4. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as cashless instruments. The player tracking unit mounted at the base of top box 6 includes a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for display various light patterns used to convey gaming information. A player playing a game on the gaming machine 2 or a person near the gaming machine may view the light patterns from the light panel 216. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine. The top box 6 can be made of a material that can shield wireless communications and limit broadcast communications to within the gaming machine 2. Together, the main cabinet 4 and the top box 6 can constitute the gaming machine housing. However, other components may also be part of the gaming machine housing in some embodiments.

Understand that gaming machine 2 is only one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 2, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as indicia of credit. As another example, the card reader 24 may accept a debit card or a smart card containing cash or credit information that may be used to register credits on the gaming machine.

Prior to beginning a game play session on the gaming machine 2, a player may insert a player tracking card into the card reader 24 to initiate a player tracking session. In some embodiments, after inserting a card, the player may be visually prompted on the display screen 16 or aurally prompted using the speaker to enter identification information such as a PIN code using the key pad 22. Typically, the player tracking card may remain in the card reader 24 during the game play session. As another example, the gaming machine may transfer player tracking information from a portable wireless device worn by the player via a wireless interface device (not shown) on the gaming machine 2. An advantage of using a portable wireless device is that the transfer of player tracking information is automatic and the player does not have to remember to correctly insert a player tracking card into the gaming machine.

During the course of a game, a player may be required to make a number of decisions, which affect the outcome of the game. For example, a player may vary his or her wager on a particular game, select a prize for a particular game, or make game decisions that affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services. In addition, when the player has inserted a player tracking card in the card reader to initiate a player tracking session, to prevent the player from leaving or "abandoning" their card in the card reader 24, a voice message, such as "please remove your card," may be projected from the sound projection device 44.

Figure 4:
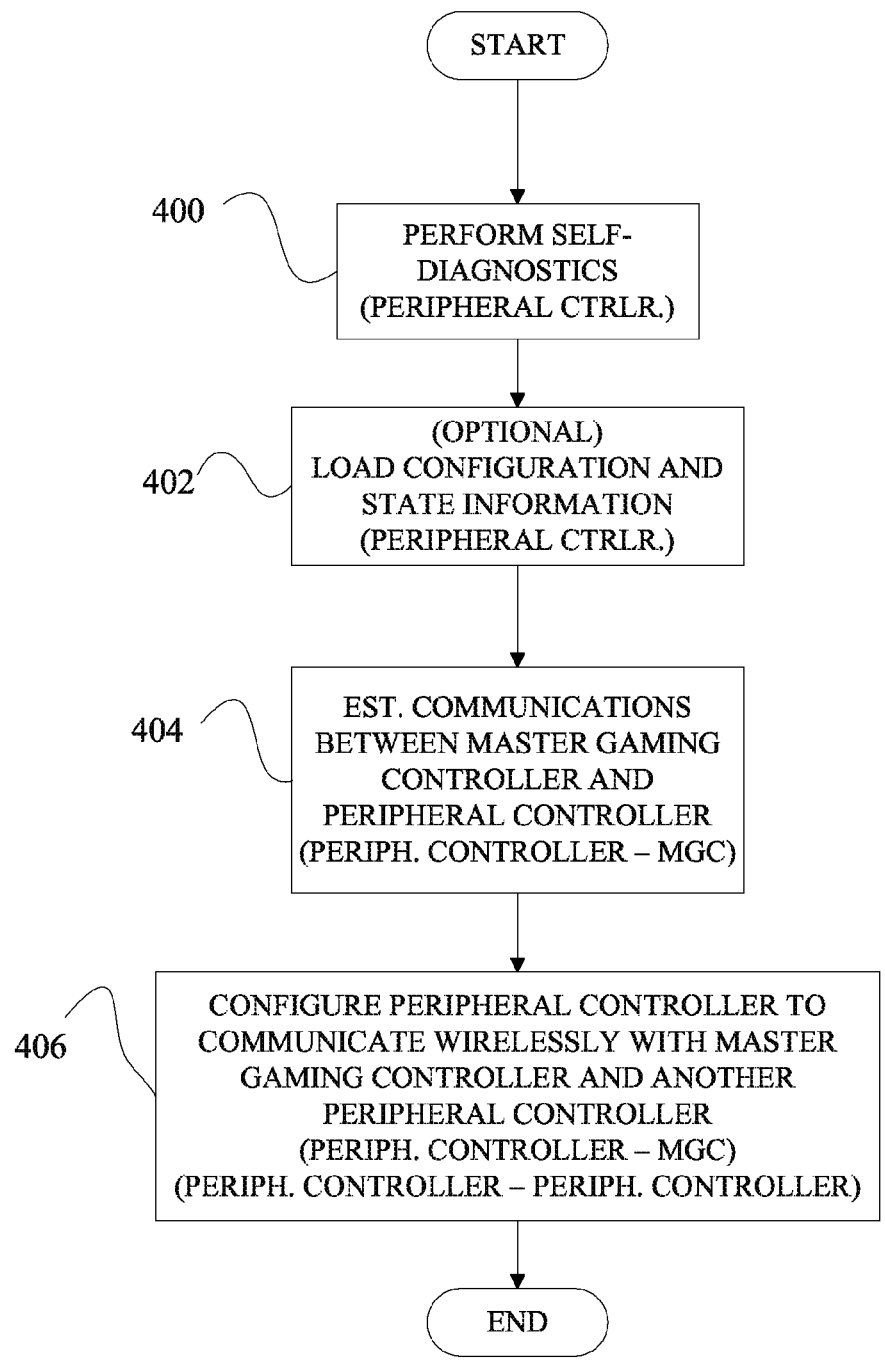
FIG. 4 is a process flow diagram of an initialization process for a peripheral device.

With reference now to FIG. 4, shown is a process flow diagram of an initialization process for a peripheral device in accordance with one embodiment of the present invention. At 400, the peripheral controller 124 (FIG. 1) performs self-diagnostics to establish whether components of the peripheral device are functioning properly. For instance, the peripheral controller may test devices such as the mechanical device 122 to determine if the mechanical device 122 is in proper working order or if the mechanical device 122 requires servicing or repair. Similarly, the peripheral controller 124 can run self-diagnostics to determine if programs are running properly, and whether the wireless transmitter/receiver 126 and antenna 128 are functioning properly.

Figure 3:
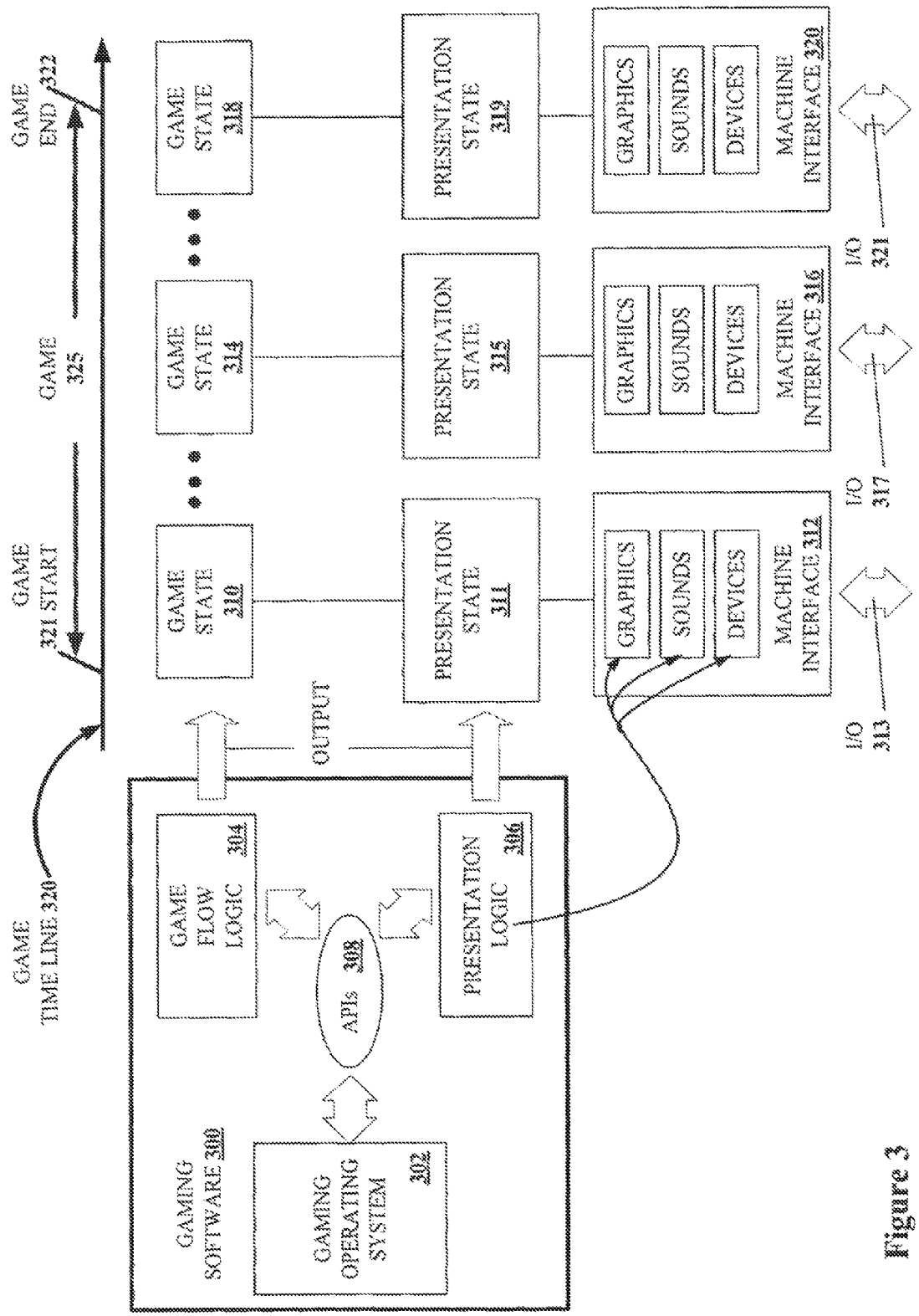
FIG. 3 is a block diagram of a gaming machine software architecture in relation to the generation of different game states on a gaming machine interface.

Next, at 402, the peripheral controller can load configuration and game state information. This configuration and game state information can provide the peripheral device with instructions for which presentations to provide, which inputs to receive, and the like, depending on the status of a game. For instance, a game state may include information such as the amount of credits that a player has input to or won on the gaming machine, previous game outcomes, and the like. This information can be saved to the gaming machine or other gaming component in the event of a power failure or other disruption to the game. If such a disruption occurs, the gaming machine can restore the game to its previous state as if the disruption had not occurred by using the game state information. FIG. 3 shows a block diagram of an exemplary gaming machine software architecture in relation to the generation of different game states on a gaming machine interface. This software architecture can be used to provide configuration and game state information.

Referring now to FIG. 3, the gaming machine software architecture provides a framework for a generation of presentation states on the gaming machine that correspond to different game states. The presentation states are generated in gaming software logic 300 where the gaming machine interface may be logically abstracted and then translated to an actual operation of various gaming devices, such as peripheral devices, that comprise the gaming machine interface. The gaming machine interface may comprise gaming devices and peripheral devices mounted within the gaming machine or connected to the gaming machine, such as displays, lights, audio devices, bill validators, coin dispensers, input devices and output devices that provide the interface to a user of the gaming machine and allow the gaming machine to operate as intended.

In FIG. 3, the gaming machine software architecture provides gaming software 300 that is divided into a plurality of gaming software modules. The gaming software modules may communicate with one another via application program interfaces. The logical functions performed in each gaming software module and the application program interfaces used to communicate with each gaming software module may be defined in many different ways. Thus, the examples of gaming software modules and the examples of application program interfaces in the present invention are presented for illustrative purposes only and the present invention is not limited to the gaming software modules and application program interfaces described herein.

Three gaming software modules, a gaming Operating System (OS) 302, a presentation logic module 306, and a game flow logic module 304 used to present a game of chance 325 on a gaming machine are shown. The gaming operating system 302, the presentation logic module 306, and the game flow logic module 304 may be decoupled from one another and may communicate with one another via a number of application program interfaces 308. In addition, these three gaming software modules can be executed by master gaming controller 102 and other components of the gaming machine, depending on the application.

In general, APIs 308 let application programmers use functions of a software module without having to directly keep track of all the logic details within the software module used to perform the functions. Thus, the inner working of a software module with a well-defined API may be opaque or a "black box" to the application programmer. However, with knowledge of the API, the application programmer knows that a particular output or set of outputs of the software module, which are defined by the API, may be obtained by specifying an input or set of inputs specified by the API.

The gaming OS 302 may load different combination of game flow logic modules 304 and presentation logic modules 306 to play different games of chance. For instance, to play two different games of chance, the game OS 302 may load a first game flow logic module and a first presentation logic module to enable play of a first game and then may load a second presentation logic module and use it with the first game flow logic module to enable play of a second game. As another example, to play two different games of chance, the game OS 302 may load a first game flow logic module and a first presentation logic module to enable play of a first game and then may load a second game flow logic module and a second presentation logic module to enable play of a second game. Details of the APIs 308 and the gaming software 300 including the Game OS 302, the game flow logic 304 and the presentation logic 306, are described in more detail in co-pending U.S. application Ser. No. 10/040,239, (IGT P078/P-671), filed on Jan. 3, 2002, by LeMay et al, titled, "Game Development Architecture that Decouples the Game Logic from the Graphics Logic," which is incorporated herein in its entirety and for all purposes.

The Gaming OS 302 comprises logic for core machine-wide functionality. It may control the mainline flow as well as critical information such as meters, money, device status, tilts and configuration used to play a game of chance on a gaming machine. Further, it may be used to load and unload gaming software modules, such as the game flow logic 304 and the presentation logic 306, from a mass storage device on the gaming machine into RAM for execution as processes on the gaming machine. The gaming OS 302 may maintain a directory structure, monitor the status of processes and schedule the processes for execution.

The game flow logic module 304 comprises the logic and the state machine to drive the game 325. The game flow logic may include: 1) logic for generating a game flow comprising a sequence of game states, 2) logic for setting configuration parameters on the gaming machine, 3) logic for storing critical information to a non-volatile memory device on the gaming machine and 4) logic for communicating with other gaming software modules via one or more APIs. In particular, after game play has been initiated on the gaming machine, the game flow logic may determine a game outcome and may generate a number of game states used in presenting the game outcome to a player on the gaming machine.

As alluded to above, gaming machines generally include hardware and methods for recovering from operational abnormalities such as power failures, device failures and tilts. Thus, the gaming machine software logic and the game flow logic 304 may be designed to generate a series of game states where critical game data generated during each game state is stored in a non-volatile memory device. The gaming machine does not advance to the next game state in the sequence of game states used to present a game 325 until it confirms that the critical game data for the current game state has been stored in the non-volatile memory device. The game OS 302 may verify that the critical game data generated during each game state has been stored to non-volatile memory. As an example, when the game flow logic module 304 generates an outcome of a game of chance in a game state, such as 310, the gaming flow logic module 304 does not advance to the next logical game state in the game flow, such as 314, until game information regarding the game outcome has been stored to the non-volatile memory device. Since a sequence of game states are generated in the gaming software modules as part of a game flow, the gaming machine is often referred to as a state machine.

In FIG. 3, a game timeline 320 for a game of chance 325 is shown. A gaming event, such as a player inputting credits into the gaming machine, may start game play 325 on the gaming machine. Another gaming event, such as a conclusion to an award presentation may end the game 322. Between the game start 321 and game end 322, as described above, the game flow logic may generate a sequence of game states, such as 310, 314 and 318 that are used to play the game of chance 325. A few examples of game states may include but are not limited to: 1) determining a game outcome, 2) directing the presentation logic 306 to present the game outcome to player, 3) determining a bonus game outcome, 4) directing the presentation logic 306 to present the bonus game to the player and 5) directing the presentation logic to present an award to the game to the player.

The presentation logic module 306 may produce all of the player display and feedback for a given game of chance 325. Thus, for each game state, the presentation logic 306 may generate a corresponding presentation state (e.g., presentation states 311, 315 and 319 which correspond to game states 310, 314 and 318, respectively) that provides output to the player and allows for certain inputs by the player. In each presentation state, a combination of gaming devices on the gaming machine may be operated in a particular manner as described in the presentation state logic 306. For instance, when game state 310 is an award outcome state, the presentation state 311 may include but is not limited to: 1) animations on one or more display screens on the gaming machine, 2) patterns of lights on various lighting units located on the gaming machine and 3) audio outputs from audio devices located on the gaming machine. Other gaming devices on the gaming machine, such as bonus wheels and mechanical reels, may also be operated during a presentation state.

The gaming devices operated in each presentation state comprise a machine interface that allows the player to receive gaming information from the gaming machine and to input information into the gaming machine. As the presentation states change, the machine interface, such as 312, 316 and 320, may change, and different I/O events, such as 313, 317, 321, may be possible. For instance, when a player deposits credits into the gaming machine, a number of touch screen buttons may be activated for the machine interface 312 allowing a player to make a wager and start a game. Thus, I/O 313 may include but is not limited to 1) the player touching a touch screen button to make a wager for the game 325, 2) the player touching a touch screen button to make a wager and start the game at the same time and 3) the player viewing the credits available for a wager. After making a wager and starting the game using machine interface 312, in game state 314, the player may be presented with a game outcome presentation using machine interface 316. The I/O 317 on the machine interface 316 may include output of various animations, sounds and light patterns. However, for machine interface 316, player input devices, such as touch screen buttons, may not be enabled.

For a more detailed discussion of an exemplary gaming machine software architecture that can be used with the present invention, see U.S. patent application Ser. No. 10/460,822, (IGT P099/P-845), filed on Jun. 11, 2003, by Lam et al., and entitled "USB SOFTWARE ARCHITECTURE IN A GAMING MACHINE," which is incorporated herein in its entirety and for all purposes.

Returning to the present embodiment shown in FIG. 4, once the configuration and state information has been loaded, then at 404, communications between master gaming controller 102 and peripheral controller 124 can be established. For instance, master gaming controller 102 and peripheral controller 124 can exchange encrypted messages to establish communications between them. Generally, encryption is the process of taking data from a sender and encoding it into a form that only a receiver will be able to decode. In one embodiment, public-private asymmetric encryption keys may be used with various embodiments of the present invention. In a public-private encryption method, information encrypted with the public encryption key may be decrypted only using the corresponding private encryption key of the public-private encryption key pair. Thus, the master gaming controller 102 and peripheral controller 124 can each have a private encryption key and may give its public encryption key to many other entities, including each other. The private encryption keys, on the other hand, are kept secret. Only the owner of the key pair is allowed to possess the private encryption keys. Other entities may use the public encryption key to encrypt data. However, as long as the private encryption key remains private, only the entity with the private encryption key can decrypt information encrypted with the public encryption key.

In one embodiment, the master gaming controller 102 and peripheral controller 124 can establish communications between them by authenticating each other using encryption key pairs. Authentication is described in more detail below with regard to sending and receiving messages. Furthermore, more details of exchanging encryption keys in a secure manner, which may be applied to the present invention, are described in co-pending U.S. application Ser. No. 09/993,163, by Rowe et al., filed Nov. 16, 2001 and entitled "Cashless Transaction Clearinghouse," which is incorporated herein by reference in its entirety and for all purposes. Also, for a general discussion of cryptography, see Schneier, Bruce, Applied Cryptography, John Wiley & Sons, Inc., which is also incorporated herein by reference for all purposes.

Next, at 406, the peripheral controller 124 is configured by the master gaming controller 102 to communicate wirelessly with the master gaming controller 102, other peripheral devices, or a combination thereof. More particularly, the master gaming controller 102 can assign the peripheral controller 124 a communication identification key that can be used to wirelessly communicate to and from the peripheral device associated with the peripheral controller 124. As described above with regard to FIG. 1, the peripheral controller can be assigned any of the various types of communication identification keys, depending on the application. For instance, in one embodiment, the communication identification key can be a global unique identifier that is used to identify the peripheral device and wirelessly communicate to and from the peripheral device. In another embodiment, the communication identification key can be a frequency range that is assigned to the peripheral device and is used to wirelessly communicate to and from the peripheral device. In another embodiment, the communication identification key can include a frequency hopping algorithm that temporally assigns different frequency ranges within which to communicate to and from the peripheral device. In yet another embodiment, the communication identification key can be a formatting protocol that allows the peripheral device to filter out wireless communications intended for other devices. Specifically, different formatting protocols can be assigned to different devices within the gaming machine. In another embodiment, the communication identification key can be a spread spectrum that provides information allowing the peripheral device to packetize outgoing messages and reassemble packets received from the master gaming controller or another peripheral device as part of an incoming message.

Once the peripheral controller 124 is configured at 406, then the peripheral device associated with peripheral controller 124 is then ready to communicate with other gaming machine devices, such as master gaming controller and other peripheral devices. Although various items are depicted in FIG. 4, it should be recognized that various items can be omitted, added, and modified within scope of the present invention. For instance, item 402 can be omitted in some embodiments, such as where configuration and state information is used by the master gaming controller 102 to provide information regarding presentations states to peripheral devices in a matter not requiring the peripheral devices to use the configuration and state information directly.

Figure 5:
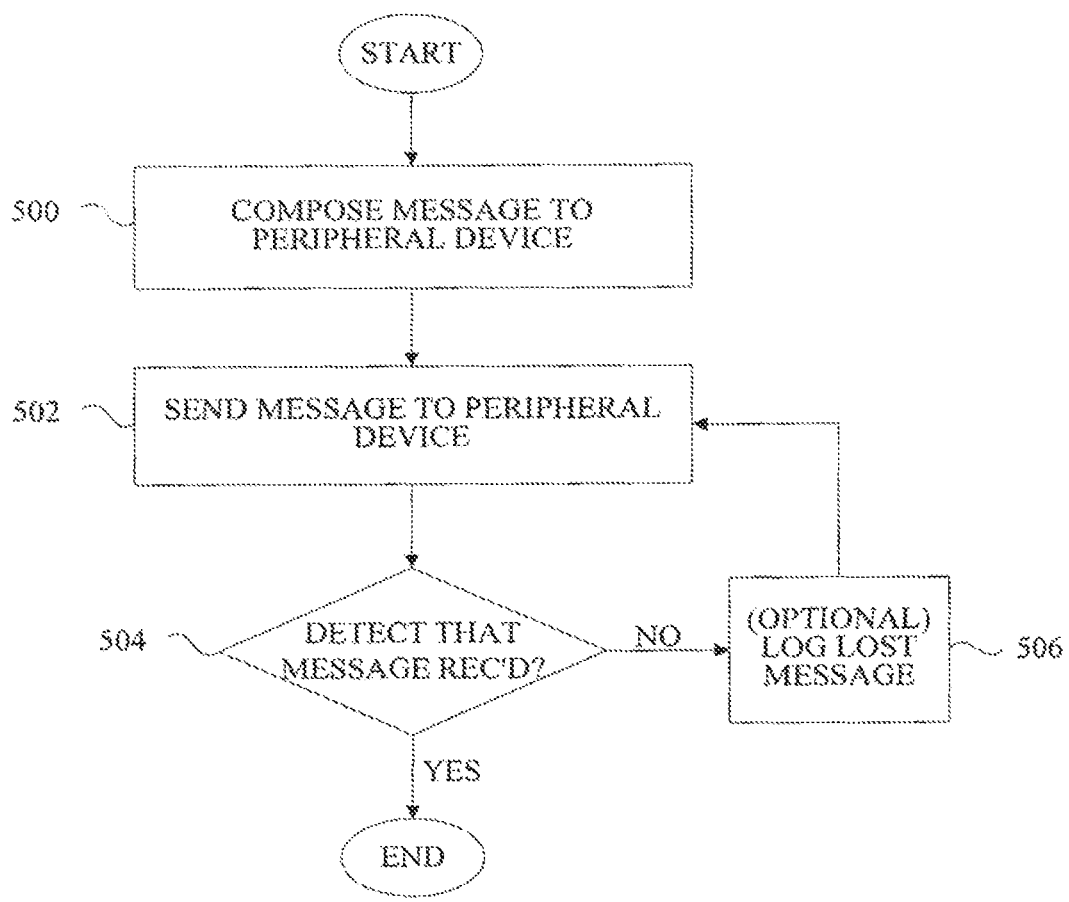
FIG. 5 is a process flow diagram of a wireless communication from a master gaming controller to a peripheral device.

With reference now to FIG. 5, shown is an exemplary process flow diagram of a wireless communication from a master gaming controller to a peripheral device. At 500, master gaming controller 102 can compose a message to a peripheral device. Next, at 502, the master gaming controller 102 can send the message to the peripheral device. In some embodiments, the message can be encrypted for greater security and reliability of communications. Generally, encryption is the process of taking data from a sender and encoding it into a form that only a receiver will be able to decode. Accordingly, unintended recipients of the message will not be able to decode the message.

Before sending the message, the master gaming controller can packetize the message, such that the message is sent as a series of separate packets. These packets can include address or other header information based on the communication identification key that was assigned to the intended peripheral device. Once the message is packetized, master gaming controller 102 can broadcast signals that include the packetized information. These broadcasted signals can be detected by various peripheral devices. The intended peripheral device can detect and receive the information based on the address or other header information that is included in or with the packets. In order to improve security and reduce the amount of crosstalk with and interception by outside devices, the broadcast can be limited to within the gaming machine. In one embodiment, the gaming machine housing can be constructed of a metal casing that shields the broadcasts to within the gaming machine housing. In another embodiment, the broadcast can have a limited range of transmission. For instance, the strength of the signal can be reduced such that the broadcast reaches only components associated with the gaming machine.

Once the message is sent to the peripheral device, then at 504, master gaming controller 102 determines whether the message was received by the peripheral device. Specifically, according to various embodiments, once the peripheral device receives the message, the peripheral device sends a confirmation, such as an acknowledgment, to the master gaming controller 102. If the master gaming controller 102 does not receive this confirmation, then the master gaming controller 102 can determine that the peripheral device did not receive the message. If the master gaming controller determines that the message has been received, the process depicted in FIG. 5 ends. However, if the master gaming controller determines that the message was not received, then the master gaming controller 102 can send the message to the peripheral device again at 502. Optionally, when the master gaming controller determines that the message was not received, the master gaming controller can include information about the lost message in a log at 506. Alternatively, the lost message can be logged by the internal network manager, as described above with regard to FIG. 1. Once the master gaming controller 102 determines that the peripheral device has received the message, the process ends.

Figure 6:
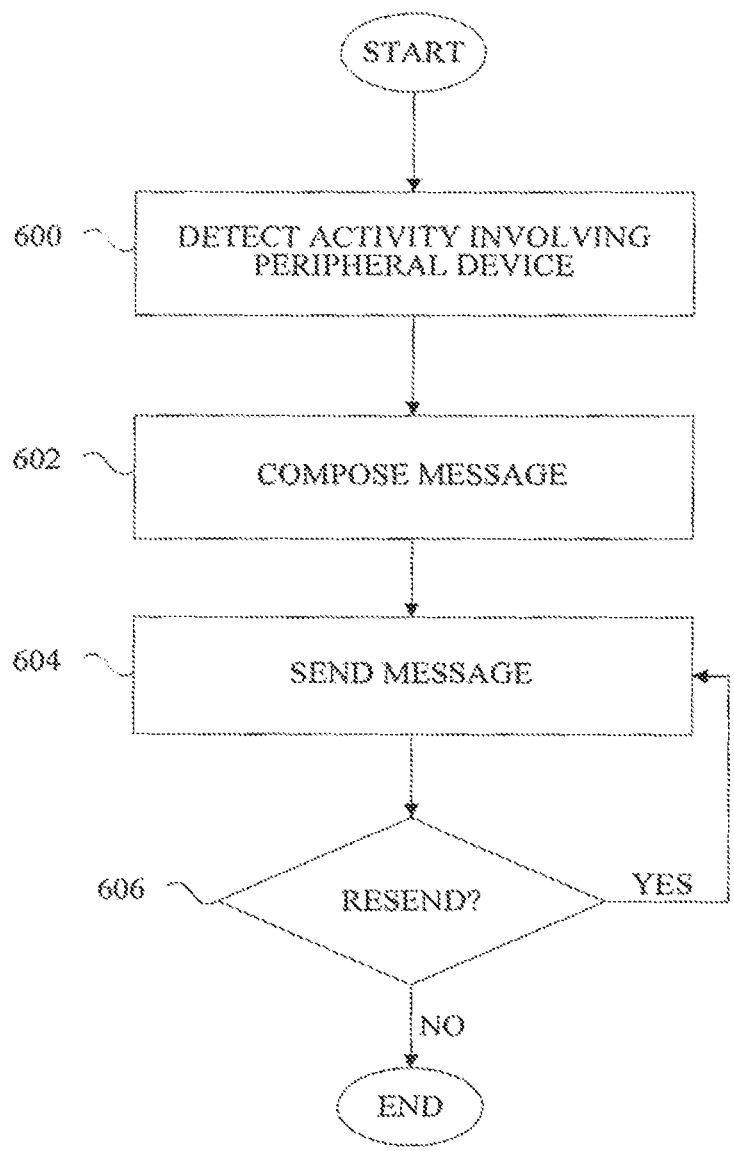
FIG. 6 is a process flow diagram of a wireless communication from a peripheral device to a master gaming controller or another peripheral device.

With reference to FIG. 6, shown is an exemplary process flow diagram of a wireless communication from a peripheral device to a master gaming controller or another peripheral device. At 600, the peripheral device detects some activity that it wants to communicate to the master gaming controller or another peripheral device. For instance, if the peripheral device is a coin hopper, then the activity detected may be that a coin has been paid out. Similarly, if the peripheral device is a coin acceptor, then the activity detected may be that a coin has been received.

Once the peripheral device detects this activity, then at 602, the peripheral device can compose a message regarding the activity. Next, at 604, the peripheral device can send the message to a recipient such as the master gaming controller or another peripheral device. In some embodiments, the message can be encrypted for greater security and reliability of communications. As described above, encryption is the process of taking data from a sender and encoding it into a form that only a receiver will be able to decode. As such, unintended recipients of the message will not be able to decode the message.

Before sending the message, the peripheral device can packetize the message, such that the message is sent as a series of separate packets. Once the message is packetized, the peripheral device can broadcast signals that include the packetized information. These broadcasted signals can be detected by various devices, including the recipient. However, based on the header information included in or with the packets, only the recipient may be able to decode the packets.

Once the message is sent to the recipient, then at 606, the peripheral device determines whether the message should be resent to the recipient. According to various embodiments, once the recipient receives the message, the recipient sends a confirmation, such as an acknowledgment, to the peripheral device. If the peripheral device does not receive this confirmation, then the peripheral device can send the message to the recipient again at 604. Once the peripheral device determines that the recipient has received the message, the process ends.

In some embodiments, when the peripheral device detects an activity at 600, the peripheral device can store information about the activity in non-volatile memory. If a message about the information is sent to the master gaming controller, then once the peripheral device detects that the master gaming controller has received this information, then the peripheral device can remove this store information from its non-volatile memory. The master gaming controller can store this information on its own non-volatile memory.

Figure 7:
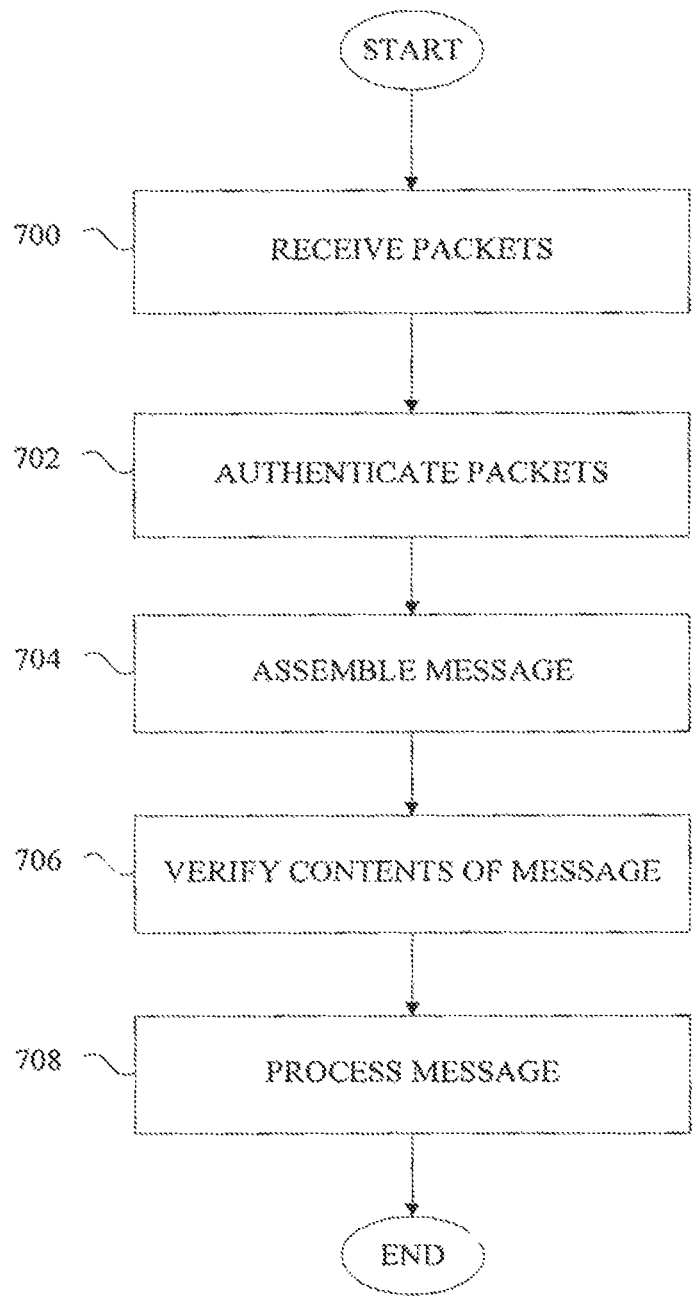
FIG. 7 is a process flow diagram of a wireless communication received by a peripheral device or a master gaming controller.

With reference to FIG. 7, shown is an exemplary process flow diagram of a wireless communication received by a recipient such as a peripheral device or a master gaming controller. At 700, the recipient receives packets from a sender. Next, at 702, the recipient can authenticate the packets to confirm that the packets originated with the sender. As described above, encryption is the process of taking data from a sender and encoding it into a form that only a receiver will be able to decode. Authentication, on the other hand, is used to verify that the information comes from the actual sender. If information received is authentic, the receiver knows who created it and knows that it has not been altered since the sender created it. These two processes, encryption and authentication, can work hand-in-hand to create a secure environment.

In one embodiment, public-private asymmetric encryption keys may be used with the methods and apparatus of the present invention. In a public-private encryption method, information encrypted with the public encryption key may be decrypted only using the corresponding private encryption key of the public-private encryption key pair. Thus, an entity with a private encryption key of public-private encryption key pair may give its public encryption key to many other entities. The public encryption key may be made available (via an Internet server, e-mail, or some other means) to whoever needs or wants it. The private encryption key, on the other hand, is kept secret. Only the owner of the key pair is allowed to possess the private encryption key. The other entities may use the public encryption key to encrypt data. However, as long as the private encryption key remains private, only the entity with the private encryption key can decrypt information encrypted with the public encryption key.

According to one embodiment, the identity of a message sender may be determined using public-private encryption key pairs. Two gaming devices, each storing public-private encryption key pairs, may exchange public encryption keys. Then, the gaming devices may exchange a series of messages that are encrypted with each other's public keys. For instance, a first gaming device may send a message with information that is encrypted with a second gaming device's public encryption key. As an example, the information may be a randomly generated number. The information sent by the first gaming device is also stored by the first gaming device.

The second gaming device may receive the message from the first gaming device and decrypt the information with its private key. Then, the second gaming device may encrypt the information with the first gaming device's public encryption key and send a reply message with encrypted information to the first gaming device. The first gaming device decrypts the information in the message using its private encryption key. Then, the first gaming device compares the information sent in the original message with the information received in the reply message. When the information received in the reply message from the second gaming device matches the information sent to the second gaming device, the identity of the second gaming device is authenticated since only the possessor of the private key may decrypt a message encrypted with its public key. As described above, details of exchanging encryption keys in a secure manner, which may be applied to the present invention, are described in co-pending U.S. application Ser. No. 09/993,163, by Rowe et al., filed Nov. 16, 2001 and entitled "Cashless Transaction Clearinghouse," previously incorporated herein by reference.

In the present embodiment, the recipient can encrypt the received message with the sender's public key. In addition, the recipient can include an additional identifier such as a randomly generated number in the message, such that the recipient can identify the message at a later time. The sender can then receive the message, including the additional identifier, and decrypt the message using its private key. The sender can then encrypt the message, including the identifier, with the recipient's public key and send the message. When the recipient receives the message from the sender, the recipient can decrypt the message with its private key. If the decrypted message includes the original message and the additional identifier, then the identity of the sender has been authenticated.

In addition to public-key algorithms, symmetric encryption algorithms can be used to encrypt and/or authenticate messages. With symmetric encryption algorithms, the same encryption key is used to encrypt and decrypt information. In practice, symmetric algorithms are used for encryption/decryption of large amounts of data, while the public-private encryption key algorithms are normally used to authenticate sender/receiver and to encrypt the symmetric keys. A more detailed description of authentication and methods of asymmetric and symmetric keys that may be used to transfer encrypted data in the present invention are described in co-pending U.S. patent application Ser. No. 10/116,424, filed Apr. 3, 2002, by Nguyen et al. and entitled, "Secured Virtual Network in a Gaming Environment," and U.S. patent application Ser. No. 10/291,926, filed Nov. 7, 2002, by Brosnan et al. and entitled, "Identifying Message Senders," both of which are incorporated herein in their entirety and for all purposes.

In the present embodiment, once the sender has been authenticated, then at 704, the packets can be assembled into a message. As described above with regard to FIG. 1, the packets can be assembled into a message using a spread spectrum, or the like. Once the message is assembled, then at 706, the contents of the message can be verified to confirm that the contents have not been altered or compromised, such as when the contents include unparseable material. For instance, a check sum algorithm can be used to create a signature for the encrypted or decrypted version of the message, and this signature can be encrypted and appended to the message. When the message is received, the check sum algorithm can be computed again to generate another signature. If the two signatures match, this suggests that the message has not been altered since the time the first signature was generated. Other algorithms and methods can also be used to verify the contents of the message in a similar manner.

Once the message has been verified, then at 708, the recipient can process the message. For instance, if the recipient is a peripheral device and the message includes an instruction from the master gaming controller to activate a light at the peripheral device, the then the peripheral device can process the message and illuminate the light according to the master gaming controller's instructions.

Although particular items are featured in the exemplary process flow diagram shown in FIG. 7, it should be recognized that modifications, omissions, and additions can be made within the scope of the present invention. For instance, item 706 can be omitted in some applications. Furthermore, in some embodiments, an item can be added in which the recipient sends a confirmation, such as an acknowledgment, to the sender upon receipt of the packets, authentication of the packets, or verification of the packets or the message assembled from the packets.

Conclusion

Although the above generally describes the present invention according to specific exemplary processes and apparatus, various modifications can be made without departing from the spirit and/or scope of the present invention. Therefore, the present invention should not be construed as being limited to the specific forms shown in the appended figures and described above.

What is claimed is:

1. A gaming machine comprising:
  a gaming machine housing; and
  a master gaming controller configured to execute a game of chance played on the gaming machine and to communicate wirelessly with a plurality of peripheral devices used to play the game of chance, wherein:
    (a) the peripheral devices are selected from the group consisting of: a player tracking unit, a light, a ticket printer, a card reader, a speaker, a bill validator, a ticket reader, a coin acceptor, a display panel, a key pad, a coin hopper and a button pad;
    (b) the peripheral devices are mounted within the gaming machine housing;
    (c) the peripheral devices are coupled to peripheral controllers; and
    (d) the master gaming controller comprises a wireless communication manager executed by the master gaming controller and configured to:
      (1) manage wireless communications between (i) the master gaming controller and the peripheral controllers of the peripheral devices, and (ii) the peripheral controllers of the peripheral devices; and
      (2) configure a first peripheral controller coupled to a first peripheral device to communicate wirelessly with both the master gaming controller and a second different peripheral controller coupled to a second different peripheral device by assigning a communication identification key to said first peripheral controller.

2. The gaming machine of claim 1, wherein assigning a communication identification key includes assigning a global unique identifier wherein the global unique identifier is used to wirelessly communicate to and from the first peripheral controller coupled to the first peripheral device.

3. The gaming machine of claim 1, wherein assigning a communication identification key includes assigning a frequency range wherein the frequency range is used to wirelessly communicate to and from the first peripheral controller coupled to the first peripheral device.

4. The gaming machine of claim 1, wherein assigning a communication identification key includes providing a frequency hopping algorithm wherein the frequency hopping algorithm temporally assigns different frequency ranges within which to communicate to and from the first peripheral controller coupled to the first peripheral device.

5. The gaming machine of claim 1, wherein assigning a communication identification key includes assigning a formatting protocol wherein different formatting protocols are assigned to different devices within the gaming machine, and wherein the formatting protocol allows the first peripheral device coupled to said first peripheral controller to filter out wireless communications intended for other devices.

6. The gaming machine of claim 1, wherein assigning a communication identification key includes providing a spread spectrum wherein the spread spectrum provides information allowing the first peripheral device coupled to said first peripheral controller to reassemble packets received from the master gaming controller or another peripheral device, packetize communications to send to the master gaming controller or another peripheral device, or combinations thereof.

7. The gaming machine of claim 1, further comprising an internal network manager configured to manage an internal wireless network implemented in the gaming machine.

8. The gaming machine of claim 7, wherein managing the internal wireless network includes counting a number of packets lost to determine a reliability rate.

9. The gaming machine of claim 8, wherein the number of packets lost includes packets for which no acknowledgement was received, packets that were corrupted, or a combination thereof.

10. The gaming machine of claim 8, wherein managing further includes adjusting the internal wireless network if the reliability rate exceeds a desired level.

11. The gaming machine of claim 7, wherein managing the internal wireless network includes monitoring different frequency channels.

12. The gaming machine of claim 1, wherein at least one of the peripheral devices includes a programmable interface, wherein the programmable interface allows interchangeability of at least one peripheral device within the gaming machine.

13. The gaming machine of claim 1, wherein wireless communications between the master gaming controller and the peripheral controllers coupled to the peripheral devices and wireless communications between the peripheral controllers coupled to the peripheral devices are confined within the gaming machine housing.

14. The gaming machine of claim 13, wherein the wireless communications within the gaming machine housing are transmitted with a limited strength, range, or a combination thereof, in order to reduce cross-communication with devices external to the gaming machine.

15. The gaming machine of claim 1, wherein the master gaming controller and the peripheral controllers coupled to the peripheral devices communicate using a wireless communication protocol selected from the group consisting of IEEE 802.11a, IEEE 802.11b, and hiperlan/2.

16. The gaming machine of claim 1, wherein the peripheral devices include a player tracking unit.

* * * * *